United States Patent [19]

Rogers, Jr. et al.

[11] 4,310,177
[45] Jan. 12, 1982

[54] LOCKING JUNCTION RING FOR CONTINUOUS-LOOP PASSIVE SEAT BELT SYSTEM

[75] Inventors: Lloyd W. Rogers, Jr., Utica; Robert L. Stephenson, Sterling Heights, both of Mich.

[73] Assignees: General Motors Corp., Detroit, Mich.; Allied Corporation, Morristown, N.J.

[21] Appl. No.: 57,605

[22] Filed: Jul. 16, 1979

[51] Int. Cl.³ .............................................. B60R 21/10
[52] U.S. Cl. .................... 280/802; 280/808; 297/469; 297/474; 24/31 R
[58] Field of Search .............. 280/801, 802, 803, 804, 280/805, 806, 807, 808; 24/31 R, 33 R, 68 SB; 297/474–480, 469

[56] References Cited
U.S. PATENT DOCUMENTS

| | | | |
|---|---|---|---|
| 3,169,291 | 2/1965 | Stacherl | 24/196 |
| 3,258,293 | 6/1966 | Sharp | 280/808 |
| 3,831,974 | 8/1974 | Keppel | 280/804 |
| 3,897,963 | 8/1975 | Seiffert | 280/802 |
| 3,953,070 | 4/1976 | Fisher | 280/808 |
| 3,976,305 | 8/1976 | Fieni | 280/802 |
| 3,981,535 | 9/1976 | Henderson | 24/196 |
| 4,069,554 | 1/1978 | Minolla | 24/171 |
| 4,101,171 | 7/1978 | Sasaki | 24/149 |

Primary Examiner—John P. Silverstrim
Attorney, Agent, or Firm—Charles E. Leahy

[57] ABSTRACT

A load locking junction device for coupling a continuous-loop belt having ends mounted on the door with an anchor belt retractably mounted inboard the seat includes a frame having an aperture defining spaced apart first and second load bearing walls. The continuous-loop belt is slidable over the first wall to define a lap belt portion and a shoulder belt portion. The anchor belt extends through the aperture and has a pin engaged in the end thereof to enlarge the end for simultaneous engagement against the second wall and the continuous-loop belt so that the belts are coupled together and maintained in engagement with the load bearing walls. A spring acts on the pin to space the anchor belt from the continuous-loop belt to permit movement of the continuous-loop belt through the frame. The imposition of oppositely directed occupant restraining loads on the continuous-loop belt and the anchor belt causes the enlarged anchor belt end to forcefully clamp the continuous-loop belt against the first wall whereby the relative restraining lengths of the lap belt and the shoulder belt portions are fixed. Disconnecting a buckle provided at one end of the continuous-loop belt terminates the occupant restraining load so that the clamping effort is terminated and the continuous-loop belt may pass freely through the junction ring to permit opening movement of the door and occupant egress.

4 Claims, 5 Drawing Figures

LOCKING JUNCTION RING FOR CONTINUOUS-LOOP PASSIVE SEAT BELT SYSTEM

The invention relates to a passive occupant restraining lap and shoulder belt system and more particularly provides a locking junction ring for joining a continuous-loop lap and shoulder belt with a retractably mounted anchor belt.

BACKGROUND OF THE INVENTION

It is well known in motor vehicles to restrain an occupant in the seat by a lap belt disposed across the lap and a shoulder belt disposed diagonally across the chest.

More particularly, it is known to provide an active seat belt system comprised of a continuous loop of belt having an upper outboard end mounted generally adjacent the occupant shoulder and a lower outboard end mounted generally adjacent the occupant hip. It is also known to provide an inboard mounted anchor belt having a buckle thereon which detachably interconnects with a junction ring carried on the continuous-loop belt to divide the continuous-loop belt into shoulder belt and lap belt portions disposed, respectively, across the upper and lower torso of the seated occupant.

It is known to provide a directional locking device in the junction ring which permits free sliding movement of the latch plate along the continuous-loop belt when the latch plate is turned normally of the belt and locks to permit only one-way transference of the belt from the lap belt portion to the shoulder belt portion when engagement of the latch plate in the buckle turns the latch plate parallel with the belt portions.

It is also known to provide a passive lap and shoulder belt system wherein the outboard ends of the continuous-loop belt are mounted on the vehicle door. The inboard anchor belt end is retractably mounted on the vehicle body inboard the seat and the outboard anchor belt end is connected to the continuous-loop by a junction ring which is slidable along the continuous-loop to divide the loop into varied length lap belt and shoulder belt portions to fit the particular seated occupant. The junction ring is conventionally comprised of a sheet metal stamping or of a length of round stock which is bent into an elongated ring shape and welded together. In either case the junction ring has an elongated central slot defining a first load bearing wall over which the continuous-loop belt is slidable and an opposed second elongated wall around which the anchor belt passes and is sewn to itself.

It is also known to provide an emergency disconnect buckle at the door connection of one of the belt ends by which the belt system may be released to permit opening movement of the door and occupant egress even though the anchor belt retractor may remain locked after termination of vehicle deceleration.

SUMMARY OF THE INVENTION

According to the preferred embodiment of the invention, a load locking junction device is provided to couple a continuous-loop belt having ends mounted on the vehicle door with an anchor belt retractably mounted at the inboard side of the occupant seating position. The junction device includes a frame having a central elongated aperture defining spaced apart first and second elongated load bearing walls. The continuous-loop belt is slidable over the first wall to divide the continuous-loop belt into a lap belt portion and a shoulder belt portion. The anchor belt extends through the aperture and has a pin engaged in the end thereof to enlarge the anchor belt end portion for simultaneous engagement against the second wall and the continuous-loop belt so that the belts are coupled together and maintained in engagement with the load bearing walls against migration toward the ends of the elongated aperture. A spring acts between the frame and the pin to normally hold the anchor belt in spaced relation from the continuous-loop belt and thereby permit free adjusting movement of the continuous-loop belt through the frame. The imposition of oppositely directed occupant restraining loads on the continuous-loop belt and the anchor belt during emergency induced vehicle deceleration causes the enlarged anchor belt end portion to forcefully clamp the continuous-loop belt against the first load bearing wall whereby the restraining lengths of the lap belt and shoulder belt portions are fixed relative one another. A disconnect buckle provided at one end of the continuous-loop belt may be disconnected to terminate the occupant restraining load so that the clamping effort is terminated and the continuous-loop belt may pass freely through the junction ring to permit opening movement of the door and occupant egress.

The object, feature, and advantage of the present invention resides in the provision of a junction ring which normally permits adjusting movement of the continuous-loop belt through the junction ring and locks the continuous-loop belt against movement therethrough during occurrence of a belt load indicative of occupant restraint during emergency vehicle deceleration.

Another object, feature and advantage of the invention resides in the provision of a load responsive junction ring adapted to unlock the continuous-loop belt for movement through the junction ring when the belt load is terminated by release of a disconnect device associated with one of the belt portions.

A still further object, feature and advantage of the invention resides in the provision of a junction ring adapted to connect a continuous-loop belt with an anchor belt and wherein a pin or the like is captured within the end of the anchor belt and bears simultaneously against the junction ring frame and the continuous-loop belt to maintain the respective belt portions in engagement with the load bearing walls of the junction ring aperture and simultaneously prevent migration toward the opposite ends of the aperture.

DESCRIPTION OF THE DRAWINGS

These and other objects, features and advantages of the invention will become apparent upon consideration of the description of the preferred embodiment, and the appended drawings in which.

DESCRIPTION OF THE PREFERRED EMBODIMENT

Figures 1, 2, 3:
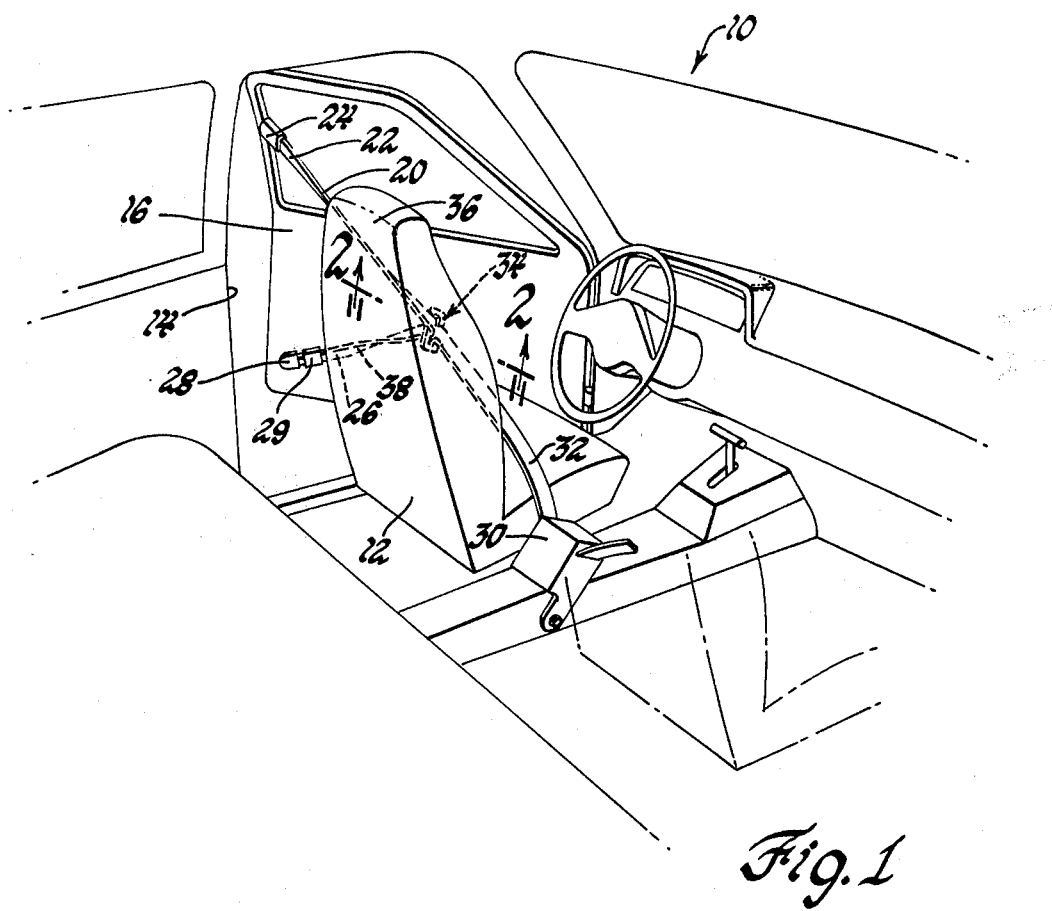
FIG. 1 is a perspective view of a vehicle body showing a passive seat belt system having a locking junction ring according to the invention.
FIG. 2 is a view taken in the direction of arrows 2—2 of FIG. 1 and shows the junction ring prior to imposition of an occupant restraining load on the restraint belt.
FIG. 3 is a view similar to FIG. 2 but showing the junction ring having locked the continuous-loop belt against movement therethrough upon imposition of occupant restraining load thereon.

Referring to FIG. 1 there is shown a vehicle body 10 having a seat 12 located laterally adjacent a door opening 14. A door 16 is hingedly mounted on the vehicle body 10 for swinging movement between an open position shown in FIG. 1 and a closed position.

A three-point continuous-loop passive occupant restraint system for restraining an occupant in the seat 12 includes a continuous-loop belt 20 having an upper end 22 attached to the upper rear corner of the door by an anchor plate 24 and a lower end 26 attached to the lower rear corner of the door by an anchor plate 28. An emergency disconnect buckle 29 is interposed in the belt 20 adjacent the anchor plate 28.

An anchor belt 32 has an inboard end which is retractably mounted by a retractor 30 suitably mounted on the vehicle 10 inboard the occupant seating position. The retractor 30 is preferably of the vehicle inertia sensitive type having a lockbar which is engaged with a belt reel by a pendulum or other inertia responsive member upon the occurrence of a predetermined level of vehicle deceleration.

A junction ring assembly 34 is attached to the outboard end of the anchor belt 32 and slidably encircles the belt 20 to define a shoulder belt portion 36 and a lap belt portion 38.

Figure 4:
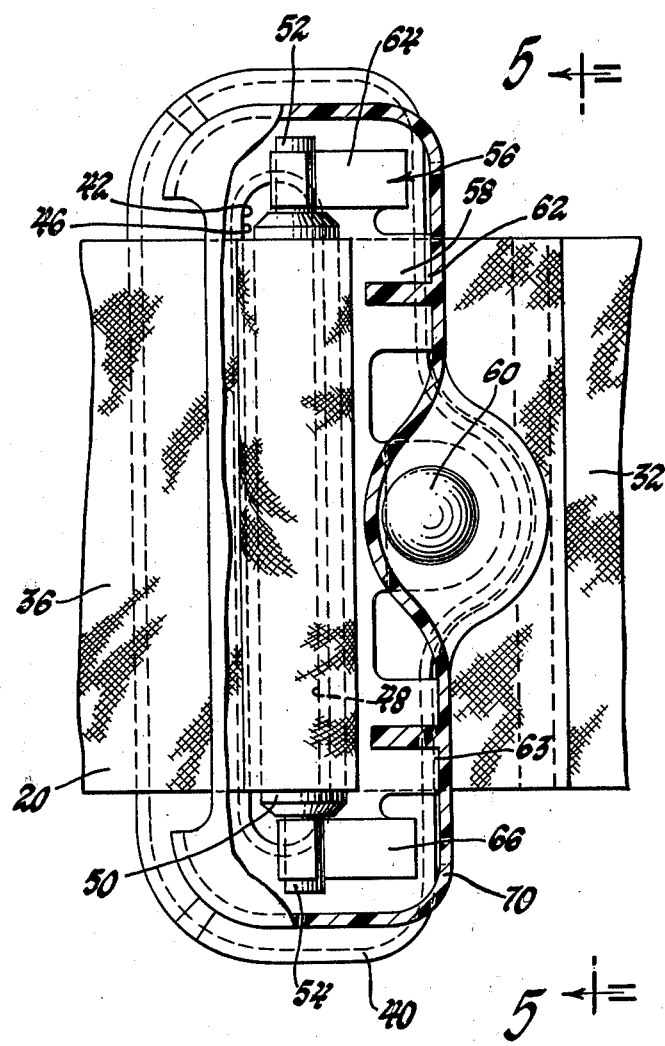
FIG. 4 is a sectional view taken in the direction of arrows 4—4 of FIG. 2.
Figure 5:
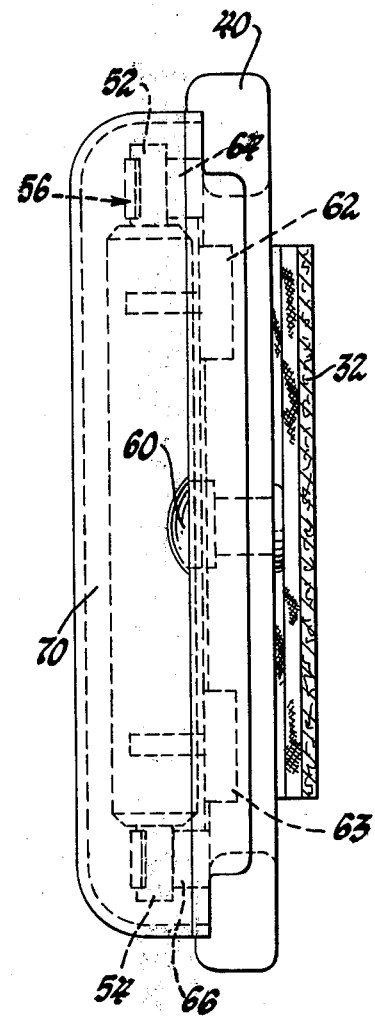
FIG. 5 is a view taken in the direction of arrows 5—5 of FIG. 4.

Referring to FIGS. 2, 4 and 5, it is seen that the junction ring assembly 34 is comprised of a ring-like frame member 40 of stamped steel construction having an elongated central belt receiving aperture 42. The frame member 40 is preferably coated with a plastic coating 44 which is decorative and also defines a first belt load bearing wall 46 which is slidably engaged by the continuous-loop belt 20 and a second load bearing wall 48 at the other side of the belt receiving aperture 42 which is slidably engaged by the outboard end of the anchor belt 32.

As best seen in FIG. 2, the anchor belt 32 passes through the belt receiving aperture 42, is looped about a pin 50, and returns through the aperture 42. The anchor belt 32 is stitched to itself so that the pin 50 is captured therein as seen in FIG. 2. As best seen in FIGS. 4 and 5, the pin 50 has reduced diameter end portions 52 and 54 which extend laterally beyond the end walls of the aperture 42. A leaf spring 56 of stamped steel includes a base 58 which is attached to the frame member 40 by a rivet 60. Spring base 58 has upstanding legs 62 and 63 which wrap over the edge of the frame 40 to prevent rotation of the leaf spring 56 about the rivet 60. The leaf spring 56 has laterally spaced spring legs 64 and 66 which respectively encircle and engage the end portions 52 and 54 of pin 50 to normally establish the pin 50 at its position of FIG. 2 in which the anchor belt 32 is held in spaced relation away from engagement with the continuous-loop belt 20.

Referring again to FIG. 1, it will be understood that inboard swinging movement of the door 16 from the open position to the closed position moves the belt anchorages 24 and 28 adjacent the outboard occupant shoulder and the outboard occupant hip. Simultaneously, the retractor 30 winds the anchor belt 32 to establish the junction ring assembly 34 adjacent the inboard hip. Accordingly, the shoulder and lap belt portions of the continuous-loop belt 20 are established in their respective restraining positions across the body of the vehicle occupant.

It will be understood that the effort of the leaf spring 56 is greater than the retracting effort of the retractor 30 so that the pin 50 will hold the anchor belt 32 in spaced relation away from engagement with the continuous-loop belt 20. Accordingly, the continuous-loop belt 20 may pass freely through the junction ring assembly 34 in either direction as necessary to adjust the relative lengths of the shoulder and lap belt portions to facilitate occupant ingress and egress, to facilitate movement of the occupant within the seat, and to fit the size of a particular seated occupant.

Upon occurrence of a predetermined level of vehicle deceleration, the retractor 30 locks the length of the anchor belt 32 so that forward movement of the occupant is restrained by the shoulder and lap belt portions. The occupant restraining loads are transferred to the junction ring assembly 34 in the outboard direction by the shoulder and lap belt portions and in the inboard direction by the anchor belt 32. The leaf spring 56 yields when the belt load reaches a predetermined level so that the anchor belt 32 is carried into clamping engagement with the continuous-loop belt 20 as seen in FIG. 3 to lock the continuous-loop belt against travel through the junction ring and thereby fix the relative lengths of the lap and shoulder belt portions.

The reduced diameter end portions 52 and 54 of the pin 50 are engageable with the frame member 40 to prevent the pin 50 from being pulled through the frame aperture 42 and to also limit the clamping load applied on the continuous-loop belt. In this regard, referring to FIG. 3, it is preferred that the end portions 52 and 54 engage the frame member 40 to limit the compression of the continuous-loop belt 20 and the anchor belt 32 to about one-half to three-fourths of their normal thickness. The pin 50 also assures even distribution of the belt loads along the first and second load bearing walls 46 and 48 and prevents migration of the belts to the opposite ends of the aperture 42.

A molded plastic cover 70 is attached to the frame 40 by rivet 60 and conceals the frame, the pin 50 and spring 56.

Referring to FIG. 3, it will be understood that an occupant restraining load on the shoulder belt portion 36 which is greater than the load on the lap belt portion 38 will attempt to draw the pin 50 and anchor belt 32 through the frame aperture 42 and thereby clamp the continuous-loop belt ever more tightly. On the other hand, if the load on the lap belt portion 38 is greater than the load on the shoulder belt portion 36, the continuous-loop belt will tend to move the pin 50 and anchor belt 32 in the opposite direction so that pin 50 is moved away from load bearing wall 46 and tends to unclamp the continuous-loop belt. Accordingly, it will be understood that the junction ring assembly 34 is shown herein as it would be arranged in a seat belt system wherein the occupant restraint load on the shoulder belt portion 36 is greater than the load on lap belt portion 38. Accordingly, if the configuration of the seat belt system were known to result in the lap belt load being greater than the shoulder belt load, the junction ring assembly 34 would be rotated 180° from its position of FIG. 2 so that the greater clamping effort would be applied in the direction to prevent the transference from the shoulder belt portion 36 to the lap belt portion 38.

It is known that circumstances may arise in which the inertia locking anchor belt retractor 30 may remain locked even though the vehicle deceleration condition has terminated. Accordingly, it is recognized as desirable to provide an emergency disconnect means by which the belt system can be separated to permit opening movement of the door 16 and egress of the occupant. In the embodiment shown in FIG. 1, the emergency disconnect means is provided by the emergency disconnect buckle 29 provided adjacent the lower anchor plate 28. When the emergency disconnect means is actuated by the occupant or by a rescuer outside the car, the occupant restraint load which may remain upon the belt 20 is terminated. Accordingly, the leaf spring 56 moves the pin 50 sufficiently out of clamping engagement with the continuous-loop belt 20 to permit travel through the junction ring assembly 34 so that the door may be opened and the occupant may exit the vehicle. The buckle could also be located adjacent the upper anchor plate 24 of the shoulder belt portion 36. Furthermore, the emergency disconnect means may be associated with the retractor 30 in the form of a lever actuable to forcibly disengage the lockbar from the belt reel.

Thus, it is seen that the invention provides a new and improved junction ring for connecting a continuous-loop belt with an anchor belt in a manner which locks the continuous-loop belt against transference through the junction ring when an occupant restraining load is imposed on the belt system and furthermore maintains the belt portions in uniform load distributing engagement with the elongated load bearing surface walls of the junction ring frame and thereby prevent migration of the belts toward the opposite ends of the elongated aperture.

While this invention has been disclosed primarily in terms of the specific embodiment shown on the drawings, it is not intended to be limited thereto, but rather only to the extent set forth in the appended claims. For example, while the load locking junction ring of the invention is disclosed herein as used in a door connected passive seat belt system, it is recognized that the junction may have used other seat belt configurations including active three-point seat belt systems. Furthermore, it will be understood that the leaf spring 56 may be replaced by any suitable means such as a frangible projection of the molded plastic cover 70 for establishing a normal position of the pin 50.

The embodiments of the invention in which an exclusive property or privilege is claimed are defined as follows:

1. In combination with a vehicle seat belt system including a continuous-loop belt having ends mounted on one side of the vehicle seat and an anchor belt having a first end mounted on the other side of the seat and a second end, a junction device adapted to couple the second end of the anchor belt with the continuous-loop belt and to divide said continuous-loop belt into a lap belt portion and a shoulder belt portion, said junction device comprising:
   a ring-like frame member having an elongated central belt receiving aperture defining a first belt load bearing wall adapted for sliding engagement by the continuous loop-belt and a second load bearing wall for engagement by the anchor belt second end;
   said anchor belt second end being enlarged to prevent passage of the anchor belt second end through the frame member aperture so that the continuous-loop belt and the anchor belt are effectively coupled;
   the imposition of oppositely directed occupant restraining loads on the continuous-loop belt and the anchor belt during emergency induced vehicle deceleration causing the enlarged anchor belt second end to simultaneously engage against the second bearing wall and the continuous-loop belt to forcefully clamp the continuous-loop belt against sliding movement along the first load bearing wall whereby the lengths of the lap and shoulder belt portions are fixed relative one another.

2. The combination of claim 1 including spring means acting between said frame member and said second end of said anchor belt to normally hold said second end spaced from said continuous-loop belt, said spring means being yieldable upon the imposition of said restraining loads to permit engagement of said second end of said anchor belt with said second bearing wall and said continuous-loop belt and being effective upon cessation of said imposition of said restraining loads to again hold said second end of said anchor belt spaced from said continuous-loop belt.

3. In combination with a vehicle seat belt system including a continuous-loop belt having ends mounted on one side of the vehicle seat and an anchor belt having a first end mounted on the other side of the seat and a second end, a junction device adapted to couple the second end of the anchor belt with the continuous-loop belt, said junction device comprising:
   a ring-like frame member having an elongated central belt receiving aperture defining a pair of aperture end walls, a first elongated belt load bearing wall adapted for sliding engagement by the continuous-loop belt, and a second elongated load bearing wall for engagement by the anchor belt second end;
   and means captured within the anchor belt second end to enlarge the anchor belt to prevent passage of the anchor belt through the frame member aperture so that the continuous-loop belt and the anchor belt are effectively coupled;
   the imposition of oppositely directed occupant restraining loads on the continuous-loop belt and the anchor belt during emergency induced vehicle deceleration causing the enlarged anchor belt second end to simultaneously engage against the second load bearing wall and the continuous-loop belt to forcefully clamp the continuous-loop belt against the first load bearing wall to prevent migration of the belts toward the aperture end walls and to forcefully clamp the continuous-loop belt against sliding movement along the first load bearing wall.

4. In combination with a vehicle seat belt system including a continuous-loop belt having ends mounted on one side of the vehicle seat, an anchor belt having a first end and a second end, a spring wound retractor retractably mounting the anchor belt first end on the other side of the seat, and a disconnect means associated with the end mounting one of the belt ends to permit selective release of the associated belt end, a junction device adapted to couple the second end of the anchor belt with the continuous-loop belt and to divide said continuous-loop belt into a lap belt portion and a shoulder belt portion, said junction device comprising:
   a ring-like frame member having an elongated central belt receiving aperture defining a first belt load bearing wall adapted for sliding engagement by the continuous-loop belt and a second load bearing wall for engagement by the anchor belt second end;

a pin captured within the anchor belt second end to enlarge the anchor belt second end for selective simultaneous engagement against the second bearing wall and the continuous-loop belt;

spring means acting between the frame member and pin to hold the anchor belt second end in spaced relation from the continuous-loop belt against the retracting effort of the anchor belt retractor so that the continuous-loop belt may slide freely over the first load bearing wall to adjust the relative lengths of the lap and shoulder belt portions;

the imposition of oppositely directed occupant restraining loads on the continuous-loop belt and the anchor belt during emergency induced vehicle deceleration causing the enlarged anchor belt second end to clamp the continuous-loop belt against the first load bearing wall whereby the relative lengths of the lap and shoulder belt portions are fixed relative one another;

and said pin being configured relative the aperture of the frame member and the belt thickness to permit unclamping of the continuous-loop belt for sliding movement over the first load bearing wall upon termination of belt load by release of the disconnect means whereby the continuous-loop belt may pass freely through the junction means upon release of the disconnect means to facilitate occupant egress.

* * * * *